United States Patent [19]

Rauscher

[11] 4,292,723

[45] Oct. 6, 1981

[54] SHEAVE AND METHOD OF PROVIDING SAME

[75] Inventor: David A. Rauscher, Columbia, S.C.

[73] Assignee: Cable Conveyor Systems, Inc., Columbia, S.C.

[21] Appl. No.: 90,485

[22] Filed: Nov. 1, 1979

[51] Int. Cl.³ .................... B23P 6/00; B23P 6/04; B29D 15/00

[52] U.S. Cl. ............... 29/402.01; 29/402.06; 29/402.18; 29/159 R; 264/36; 264/162; 474/177

[58] Field of Search .......... 29/159 R, 402.11, 402.13, 29/402.18, 159.2, 402.01, 402.04, 402.05, 402.06, 402.07, 402.08, 402.09, 402.16; 474/174, 177, 178; 264/36, 138, 162, 259, 274

[56] References Cited

U.S. PATENT DOCUMENTS

| | | | |
|---|---|---|---|
| 1,376,742 | 5/1921 | Burnett | 474/178 X |
| 1,412,326 | 4/1922 | Williams | 264/274 X |
| 1,944,426 | 1/1934 | Greening | 474/178 |
| 2,137,987 | 11/1938 | Smith | 474/177 |
| 2,464,082 | 3/1949 | Hart | 29/402.18 |
| 2,722,734 | 11/1955 | Grant | 29/402.11 |
| 3,006,064 | 10/1961 | Watson | 29/402.16 |
| 3,229,361 | 1/1966 | Valacich | 29/402.11 |
| 3,230,616 | 1/1966 | Janssen | 29/159.2 |
| 3,386,492 | 6/1968 | Wunder et al. | 29/402.18 |
| 3,494,212 | 2/1970 | Thomson | 474/178 |
| 3,530,735 | 9/1970 | Allen | 29/159.2 X |
| 3,772,928 | 11/1973 | Gobeille | 29/159 R |
| 3,815,201 | 6/1974 | Conrad | 29/159 R |
| 3,907,624 | 9/1975 | Gravely | 264/138 |
| 4,095,637 | 6/1978 | Krishnan | 264/259 |

FOREIGN PATENT DOCUMENTS 281582  1/1931  Italy .................. 29/159.2

Primary Examiner—Lowell A. Larson
Attorney, Agent, or Firm—Mason, Fenwick & Lawrence

[57] ABSTRACT

A metal sheave is turned on a lathe to remove worn flange and groove portions to provide three roughened cylindrical surfaces of progressively greater diameter about which a peripheral rim body of polyurethane is cast in an encircling mold and permitted to cure; the sheave is then turned on a lathe to shape the polyurethane to provide peripheral flanges and a groove therebetween.

8 Claims, 10 Drawing Figures

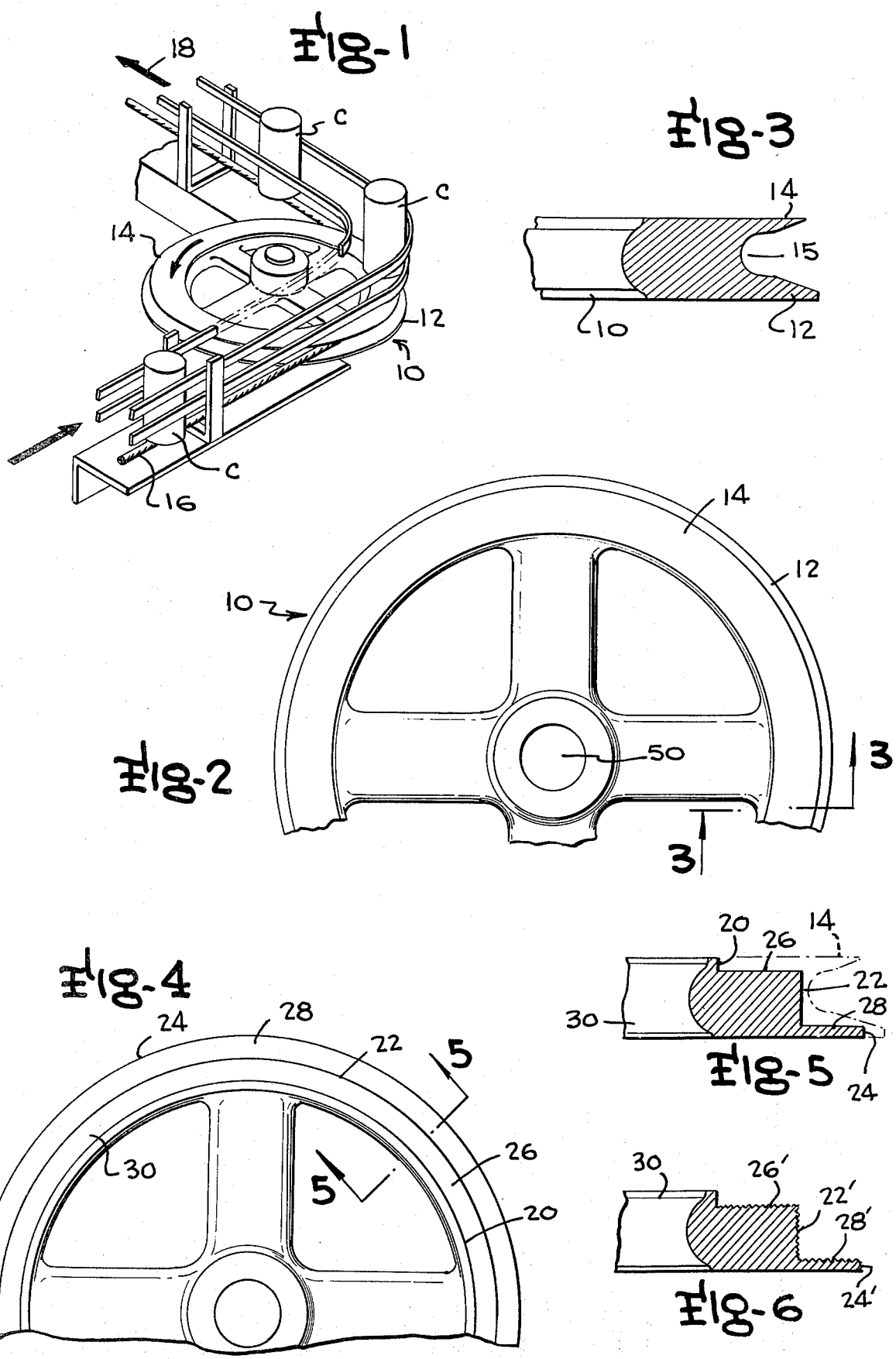

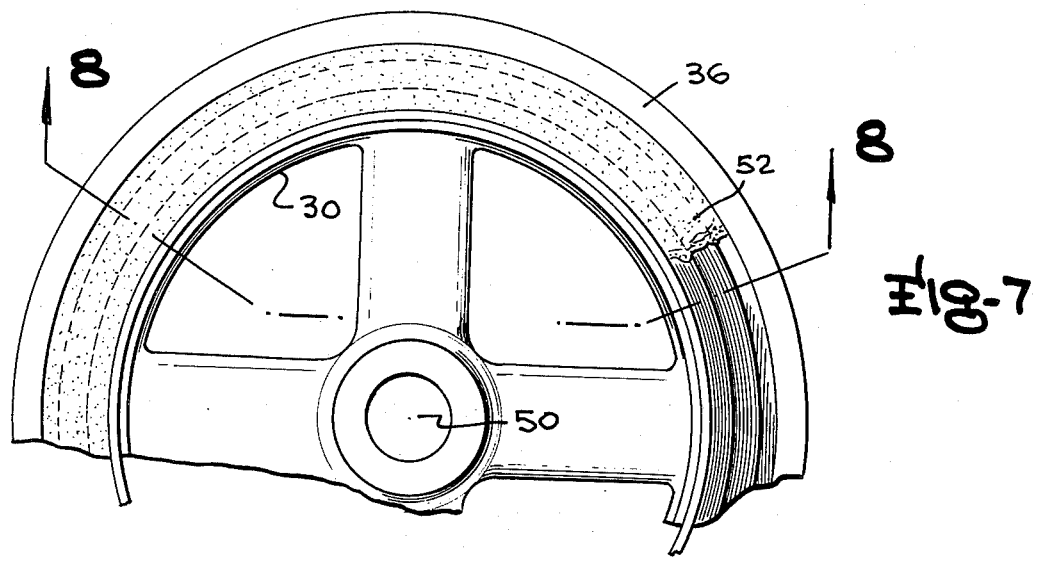
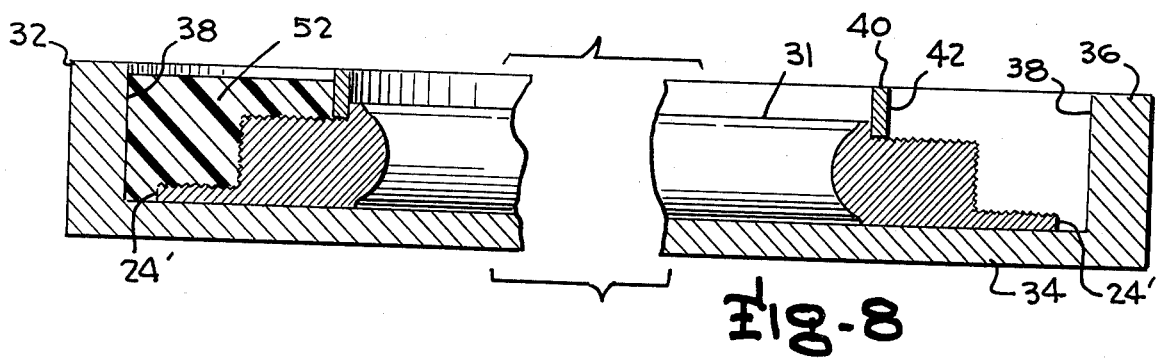
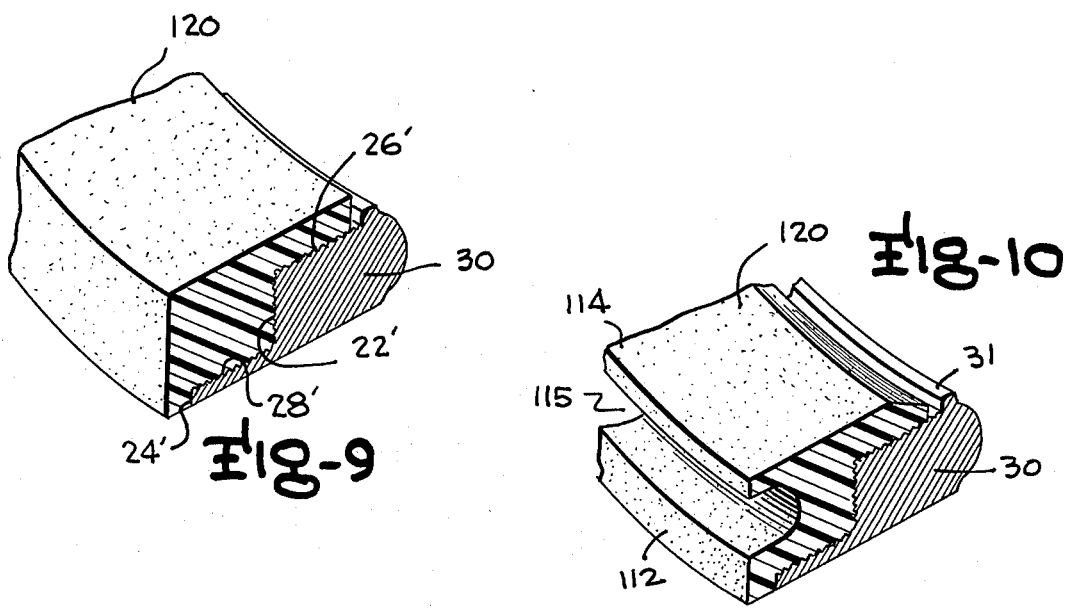

SHEAVE AND METHOD OF PROVIDING SAME

BACKGROUND OF THE INVENTION

This invention is in the field of pulleys and sheaves of the type frequently employed for supporting and moving cable stretches employed in conveying cans and the like. More specifically, the present invention is directed to a new method of reconditioning worn metal sheave, which were previously scrapped, to provide a resultant new and improved sheave construction superior to the original and which can be reconditioned many times at substantially less cost than the cost of a new sheave.

Metal pulleys and sheaves employed in cable conveyors in canneries and the like are subjected to a great deal of rough usage and corrosive chemicals and consequently rapidly become worn with frequent replacement being necessary. Usually, one of the rims of the sheaves is subjected to greater friction than the other and it consequently wears downwardly to a substantially greater degree than the other rim to the point at which the rim becomes ineffective for retaining the conveyor cable in position in the sheave and consequently has to be replaced. Another substantial problem with both new and worn metal sheaves employed for conveying cans on cable conveyors such as in canneries, bottlers and the like is the fact that engagement of the can bottoms with the metal sheaves creates a great amount of objectionable clatter and noise which is environmentally objectionable.

Additionally, the cans on cable conveyors are sometimes stopped for substantial time periods while the conveyor continues to operate; under such conditions, metal sheaves will soon wear or damage can bottoms against which they continue to rotate.

Others have attempted to cast polyurethane on metal supports to provide a trunnion; however, geometric imbalance of such devices has resulted in a high failure rate of such devices.

Therefore, it is the primary object of this invention to provide a new and improved method of reconditioning metal sheaves to permit subsequent usage and reconditioning substantially indefinitely.

Yet another object of the present invention is the provision of a new and improved sheave construction that is substantially quieter in operation than prior known cable conveyor sheaves.

The foregoing and other objects of this invention are achieved by the present invention through the reconditioning of worn metal sheaves by first turning the sheaves to completely remove the most heavily worn flange along with the original groove and a substantial portion of the other less worn flange. Basically, the sheave is turned to provide three cylindrical outer surfaces in side-by-side relationship with the center cylindrical surface being connected to the outer surfaces by radial surfaces. All of the turned cylindrical and radial surfaces are provided with a roughened texture and the metal core body formed as a result of the turning operation is then positioned in a circular mold and uncured polyurethane components are poured into the mold to provide an encircling plastic rim body adhering to the roughened surface of the metal core body. The plastic rim body is then itself turned about the geometric center of the metal core body to provide first and second flanges between which a groove is positioned and which is dimensioned for receiving the cable of the cable conveyor system with which the sheave is to be employed. One side face of the resultant sheave is formed of plastic. The sheave is installed in the conveyor with the plastic side facing upwardly so that cans conveyed by the conveyor ride across the plastic side so that there is no metal to metal contact and the resultant noise is substantially less than is the case with metal sheaves having metal components engaged by the cans. Moreover, when the polyurethane rim components become worn, they can be stripped from the metal body and replaced by repeating the molding and turning procedures at substantially less cost than the cost of a new metal sheave.

A better understanding of the preferred inventive embodiments of the method and the inventive item will be achieved when the following detailed description is considered in conjunction with the appended drawings in which like reference numerals are used for the same parts in different figures.

DESCRIPTION OF THE DRAWINGS

FIG. 1 is a perspective view of a corner sheave of a cable conveyor installation such as in a cannery illustrating the manner in which the upper flange becomes worn;

FIG. 2 is a top plan view of a corner sheave of the type illustrated in FIG. 1;

FIG. 3 is a sectional view taken along lines 3—3 of FIG. 2;

FIG. 4 is a plan view of the sheave of FIG. 2 following a machining operation for removing worn peripheral components;

FIG. 5 is a sectional view taken along lines 5—5 of FIG. 4;

FIG. 6 is a sectional view similar to FIG. 5 but illustrating the results of a subsequent machining operation;

FIG. 7 is a top view of a portion of the sheave of FIG. 6 as positioned in a mold means for receiving plastic material to be bonded thereto;

FIG. 8 is a sectional view taken along lines 8—8 of FIG. 7;

FIG. 9 is a persepective view of a cut across the rim of the sheave of FIG. 8 illustrating the cross-section rim construction; and FIG. 10 is a perspective view similar to FIG. 9 but illustrating the cross-section of the rim construction following a final machining operation performed on the construction of FIG. 9.

DESCRIPTION OF THE PREFERRED EMBODIMENT

Attention is initially invited to FIG. 1 of the drawings which illustrates a conventional corner sheave 10 of a cable conveyor such as employed in a cannery for conveying metal cans C in a well-known manner. Sheave 10 includes a lower flange 12 and an upper flange 14 between which a groove 15 is provided for receiving a conveyor cable 16 which is driven in the direction of arrow 18.

It will be observed that the upper flange 14 is worn as best shown in FIG. 3 and it is consequently necessary to frequently replace such flanges on cast sheaves such as sheave 10 with the old sheave simply being junked. It is possible by the present inventive procedure to recondition the old sheave to permit its continued usage substantially indefinitely.

Reconditioning of the old sheave is achieved by a series of steps, the first one of which is a turning operation on a lathe or the like about axis 50 extending through the geometric center of the sheave by means of which the worn upper flange 14 is completely removed along with a radially inwardly extending portion of the underlying rim body and the original groove and a portion of the other flange 12 as shown in FIG. 5. More specifically, the portion illustrated in phantom lines of FIG. 5 is removed by the turning operation so as to provide a first cylindrical surface 20, a second cylindrical surface 22 and a third cylindrical surface 24. The first cylindrical surface 20 and the second cylidrical surface 22 are connected by a first radial surface 26, while the second cylindrical surface 22 and the third cylindrical surface 24 are connected by a second radial surface 28.

Following the machining to provide the surface illustrated in FIG. 5, the first radial surface 26 is roughened to provide a roughened surface 26′, while the second cylindrical surface 22 is similarly roughened by any conventional knurling or machining process to provide a roughened surface 22′ with the second radial surface 28 being similarly roughened to provide a roughened surface 28′ as shown in FIG. 6. Thus, the machining operation results in an annular rim body 30 formed of metal and having a cross-section as shown in FIG. 6.

After the surfaces 26′, 22′, 28′, and 24′ have been formed, these surfaces are completely cleaned to remove all oil, dirt, water or other materials from these surfaces and ths surfaces are then coated with primer. The rim body 30 is then coaxially positioned in a circular mold member 32 having a planar bottom wall 34 and a cylindrical side wall 36. The inner surface 38 of the cylindrical side wall 36 is of greater diameter than the diameter of the roughened third cylindrical surface 24′ of the annular rim body 30 as clearly shown in FIG. 8. The rim body 30 is coaxially positioned with respect to the cylindrical surface 38 so that axis 50 is coextensive with the axis of surface 38 and uncured polyurethane components are poured into the mold to provide an annular body of plastic 52 upon curing as shown in FIG. 8. The annular body of plastic is permitted to cure for 24 or more hours to permit full hardening. It should be observed that the inner cylindrical mold member 40 extends upwardly beyond the upper extent 31 of the rim body 30 and that the plastic material 50 is poured to a higher elevation than that of surface 31. After the plastic hardens, it has a cross-section as shown in FIG. 9.

The casting of the polyurethane rim can be carried out in ways now well known in the art which are disclosed in detail in a variety of sources including *Polyurethanes* by Dumbrow, Second Edition, 1965, Reinhold Publishing Corporation, New York, New York, chapter 6, pages 135-160 in their entirety and *Organic Polymer Chemistry* by Saunders, 1973, Chapman and Hall, London, England. In general, polyurethane polymers are produced by reacting a polyisocyanate with a compound containing an active hydrogen compound and in the case of elastomeric products, the active hydrogen containing compound is normally a polyol usually a low molecular weight polyester or polyether, preferably linear in structure, having terminal hydroxyl groups. In theory, the reaction can be carried out directly by mixing the polyisocyante and the polyol but since the handling of polyisocyanates can be hazardous, the almost universal practice in the art is to prepare a prepolymer of relatively low molecular weight from the polyisocyanate and polyol, the polyisocyanate being present in an excess so as to form isocyanate terminal groups. This prepolymer can then be admixed at the molding site with a so-called chain extender or curing agent such as diamine or diol which reacts with the isocyanate terminal groups to increase the molecular weight of the prepolymer chains and, it is believed, also form cross-linkages between such chains so as to enhance the mechanical products of the ultimate elastomer.

The influence of the polyols and polyacids used in preparing the prepolymers, as well as the choice of the particular polyisocyanate and, indeed, of the chain extender as well on the properties of the ultimate elastomer has been thoroughly explored and there are commercially available from a diversity of chemical manufacturers, a considerable variety of prepolymers and chain extenders from which the final selection is made according to the properties desired for the final elastomer following detailed descriptive specifications provided by the manufacturer. It is usually found, for example, that the mechanical strength of the elastomer is superior with linear prepolymeric polyols, whereas the chamical resistance of the elastomer is usually superior when the prepolymeric polyol has a somewhat branched chain structure. The pot life or practical handling time is another important aspect and ordinarily diamine chain extenders provide a shortened pot life over diol chain extenders. For example, the prepolymeric polyol can be polyethylene adipate, polypropylene glycol or polyoxytetramethylene glycol, with a molecular weight say in the range of about 1000-3000 which has been reacted with a polyisocyanate in a sufficient excess as to provide a small content of free isocyanate groups, say about 3%-10%. Exemplary polyisocyanates include naphthylene 1,5-diisocyanate, tolylene diisocyanate, di-phenylmethane 4, 4′-diisocyanate.

The prepolymers are mixed at the casting site with an approximate stoichiometric equivalent weight (or slight deficiency) of the selected chain extender, mixing being achieved either manually or by means of a mechanical mixer, and the reactive mixture poured into the mold. Typical chain extender/curing agents include 1,4-butane diol, the dimer of tolylene diisocyante (TDI) or 3,3′-dichloro-4, 4′-diamino-diphynlmethane (MOCA) or which MOCA is preferred. In general, the diamine chain extender imparts an abbreviated pot life, an accelerated curing time as well as high tensile strength, hardness and abrasion strength, while extenders of the polyol type show an extended pot life, a prolonged curing time with a somewhat reduced strength and hardness.

The prepolymers are liquids of somewhat limited shelf life and are highly sensitive to moisture so that care must be taken to exclude moisture during storage and to avoid exposing the prepolymer to significant amounts of water during mixing. Similarly, the prepolymer must be kept in sealed containers since it will absorb sufficient moisture from the atmosphere as to form a skin and render it unsuitable for further use. If moisture is present in the reactive system, it combines with the terminal isocyanate groups of the prepolymer releasing carbon dioxide which results in foaming within the prepolymer with a consequential loss in mechanical properties. In a typical example, a liquid polyurethane preoplymer (obtained from Devcon Corp. of Danvers, Mass.) sold under the trademark FLEXANE LIQUID 94D is mixed with a curing agent of the same company and poured into the mould with exemplary results being obtained.

As a last step in the fabrication procedure, the rim body of FIG. 9 is positioned on a lathe or the like and is turned about an axis to provide a new upper flange 114 and a new lower flange 112 separated by a new groove 115 all of which are geometrically concentric to axis 50. It should be observed that an upper flat face 120 of the plastic is at a higher elevation than the elevation of surface 31 of the annular metal rim body 30.

When the reconditioned sheave of FIG. 10 is positioned on a conveyor of the type shown in FIG. 1, the cans C being conveyed by the cable rest entirely upon the plastic surface 120 so that there is a substantial reduction in the noise generated by operation of the conveyor. Moreover, there is a low coefficient of friction between the plastic of surface 120 and the metal can body so that when the downstream operations preclude movement of the cans and the conveyor continues to operate, the engagement of surface 120 with the can body does not wear the can body or otherwise damage it in the manner frequently occurring with previously employed cast metal sheaves. While the plastic body 52 of the sheave of FIG. 10 will eventually wear, it can easily be replaced by a recasting and machining operation of the plastic itself with there being no further need for metal machining. Thus, the present invention provides a longlasting sheave that can be repaired substantially indefinitely at substantial savings to the user.

Numerous modifications of the preferred embodiment of the invention will undoubtedly occur to those of skill in the art; for example, sheaves having plural grooves can also be provided. Therefore, it should be understood that the spirit and scope of the invention should be limited solely by the appended claims.

I claim:

1. A method of reconditioning a sheave having an annular rim body including first and second peripheral flanges between which a peripheral trough is defined, said method comprising the steps of removing a first annular portion of said rim body including said first peripheral flange and extending radially inwardly beyond the original location of the bottom of the peripheral trough, removing a second annular portion of said annular rim body including said peripheral trough and a portion of said second peripheral flange, said second annular portion extending radially inwardly beyond the original location of the bottom of said peripheral trough but extending radially inward a distance less than the inward extent of said first annular portion, removing a third annular portion of said annular rim body comprising a radially outermost portion of said second flange positioning said sheave in a mold, casting liquid uncured plastic in the mold to fill the space previously occupied by the removed portions of said annular rim body and to also extending radially therebeyond, permitting said liquid plastic to cure and harden and machining said plastic to define first and second peripheral flanges separated by a peripheral trough.

2. The invention of claim 1 wherein said annular portions are removed by a turning operation on a lathe.

3. The method of claim 1 wherein said annular portions are removed by a turning operation on a lathe and including the further step prior to casting of providing a roughened surface on the remaining surfaces of said annular rim body from which said first, second and third portions have been removed.

4. The method of claim 1 wherein said annular portions are removed by a turning operation providing a roughened surface on remaining portions of said annular rim body and further including the step of spraying metal primer on said roughened surface prior to the casting of said liquid uncured plastic in said mould.

5. The method of claim 1 wherein said cured plastic is polyurethane.

6. The method of claim 5 wherein said annular portions are removed by turning operation on a lathe.

7. The method of claim 5 wherein said annular portions are removed by a turning operation on a lathe and including the further step prior to casting of providing a roughened surface on the remaining surfaces of said annular rim body from which said first, second and third portions have been removed.

8. The method of claim 5 wherein said annular portions are removed by a turning operation providing a roughened surface on remaining portions of said annular rim body and further including the step of spraying metal primer on said roughened surface prior to the casting of said liquid uncured plastic in said mould.

* * * * *